United States Patent [19]

Swanson et al.

[11] 4,190,223
[45] Feb. 26, 1980

[54] BRACING STRUT FOR FLEXIBLE CONDUITS

[75] Inventors: Kenneth R. Swanson, Lawrence; Richard J. Beilfuss, Baldwin City, both of Kans.

[73] Assignee: Aeroquip Corporation, Jackson, Mich.

[21] Appl. No.: 881,594

[22] Filed: Feb. 27, 1978

[51] Int. Cl.² .................. E04G 25/06; F16M 13/00
[52] U.S. Cl. ............................... 248/68 R; 248/49; 248/70; 248/354 S
[58] Field of Search .................. 248/354 S, 356, 357, 248/49, 54 R, DIG. 1, 57, 68 R, 70, 276; 52/167; 403/230; 137/356

[56] References Cited

U.S. PATENT DOCUMENTS

| 598,221 | 2/1898 | Going | 248/276 |
|---|---|---|---|
| 1,194,772 | 8/1919 | Newman et al. | 248/276 X |
| 2,219,169 | 10/1940 | Alter | 248/354 S X |
| 2,372,214 | 3/1945 | Loepsinger | 248/54 R |
| 2,787,124 | 4/1957 | Donahue | 248/54 R |
| 2,832,557 | 4/1958 | Reinert | 248/276 |
| 3,171,627 | 3/1965 | Tapley et al. | 248/354 S |
| 3,430,645 | 3/1969 | Stalph | 248/54 R X |
| 3,528,634 | 9/1970 | Jenkins | 248/70 |
| 3,606,704 | 9/1971 | Denton | 52/126 X |

FOREIGN PATENT DOCUMENTS

| 602448 | 3/1960 | Italy | 248/54 R |
|---|---|---|---|
| 213273 | 6/1941 | Switzerland | 248/354 S |
| 535823 | 4/1941 | United Kingdom | 248/54 R |

Primary Examiner—Rodney H. Bonck
Attorney, Agent, or Firm—Beaman & Beaman

[57] ABSTRACT

A flexible and adjustable bracing strut for bracing and supporting flexible conduit systems and permitting a strut to be removed from a multi-strut system without disturbing the entire system. The strut structure includes a flange support mounted upon the conduit to be supported, or an anchor, to which a flange is bolted and spherical recesses defined in the support and flange receive a ball having a threaded stem adjustably received within the end of an elongated rigid strut bar. Opposite hand threading at the bar ends permits bar rotation to adjust the spacing between balls mounted at the bar ends in a turnbuckle effect.

1 Claim, 3 Drawing Figures

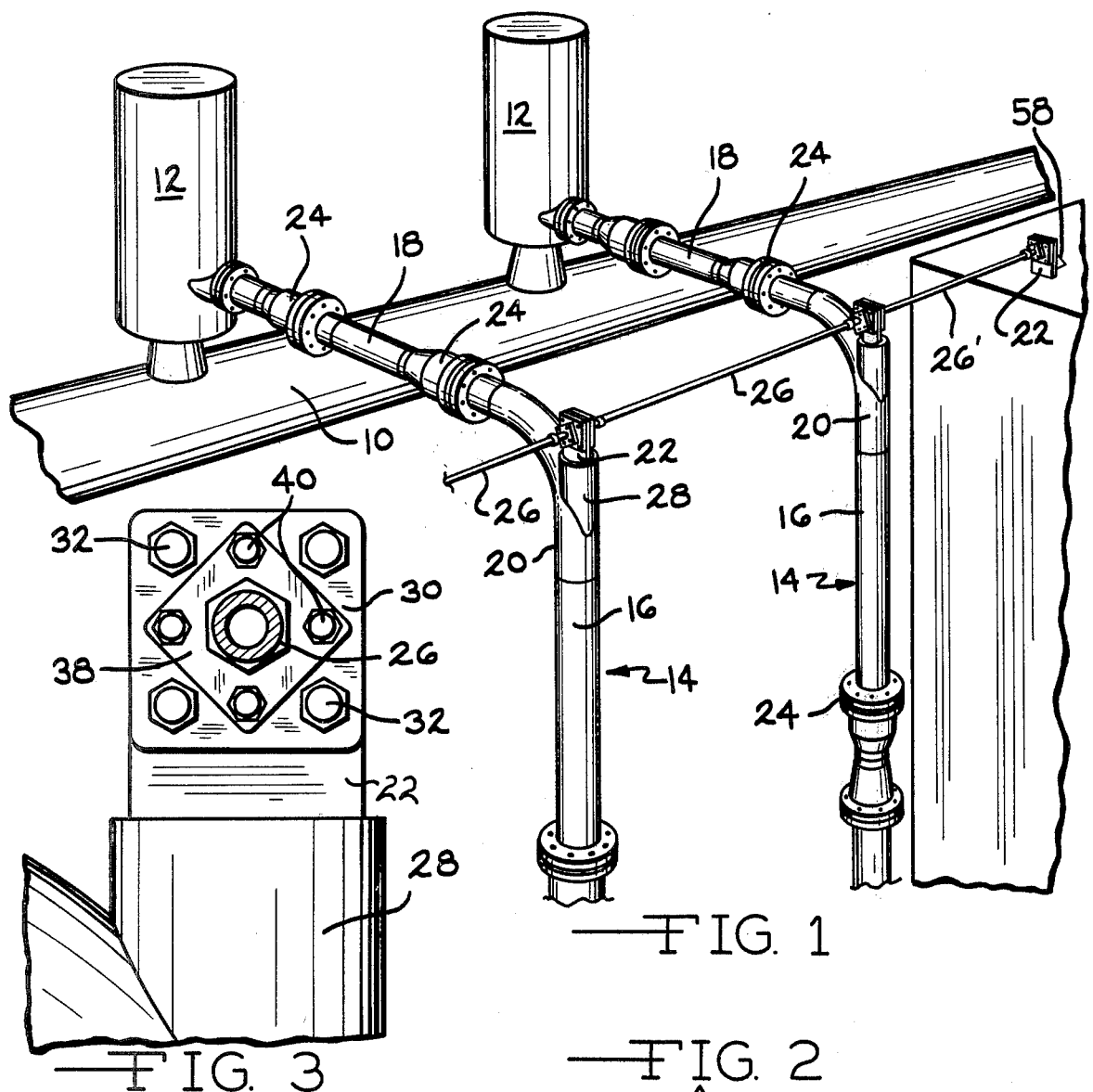
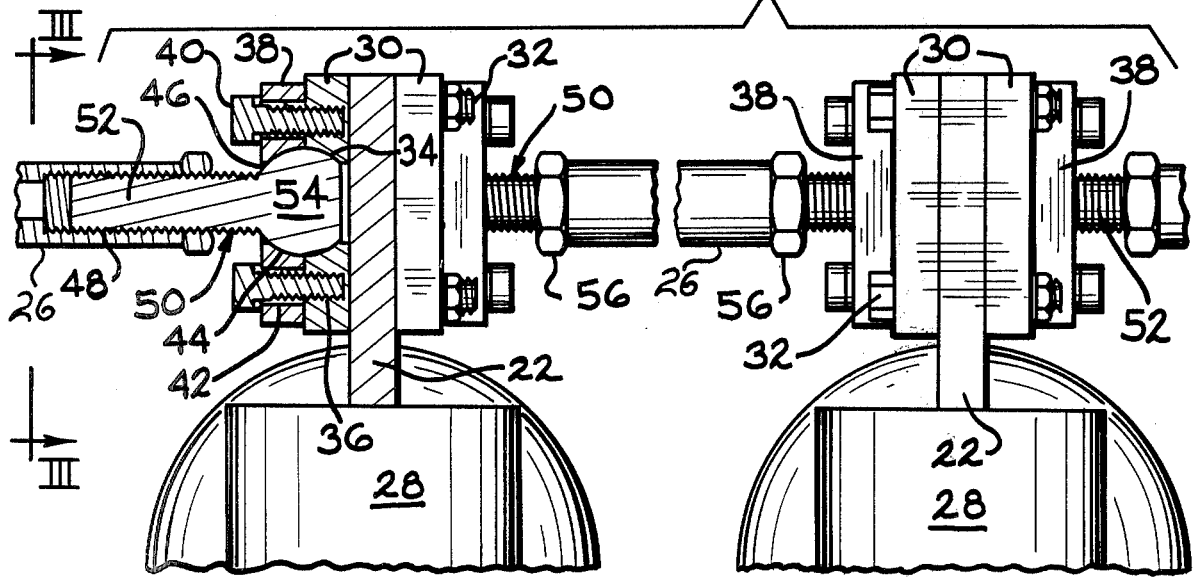

BRACING STRUT FOR FLEXIBLE CONDUITS

BACKGROUND OF THE INVENTION

The invention pertains to braces for conduit systems.

In complex conduit systems transferring a fluid medium, either gaseous or liquid, wherein the temperature of the medium fluctuates the temperature changes in the conduit system produce expansion and contraction which create stresses that must be relieved to prevent fracturing. In such conduit systems it is common to utilize flexible couplings which permit contraction and expansion without fluid loss such that conduit movement will compensate for the effects of thermal changes.

However, in flexible conduit systems utilizing spherical or ball joints the universal flexibility of such joints requires bracing to eliminate misalignment.

In a relatively complicated flexible conduit system wherein a plurality of adjacent conduits are interconnected by braces, particularly braces utilizing ball sockets, the bracing structure has been such that the replacement of a single brace, or conduit, adjacent other braces and conduits necessitated the disassembly of a plurality of braces in order to provide the necessary movement to permit disassembly and removal. Also, with known bracing systems for flexible conduit installations relatively complex devices have been previously required in order to achieve the versatility of dimensional variations often necessary.

BRIEF DESCRIPTION OF THE INVENTION

It is an object of the invention to provide a flexible bracing strut construction for use with flexible conduit systems wherein the strut structure may be readily removed from, or installed into, a completed conduit system without requiring disassembly of adjacent bracing struts or conduits.

An additional object of the invention is to provide a flexible bracing struts for flexible conduit systems providing bracing functions which does not hinder the movement of the conduit system, yet adequately braces the conduits, and wherein manufacturing techniques are simplified and fabrication costs are reasonable.

A further object of the invention is to provide a bracing strut for use with flexible conduits wherein a rigid spacing bar is employed having threads located at opposite ends whereby a turnbuckle effect is employed to accommodate dimensional variations between adjacent conduits and strut supports connected thereto.

In the practice of the invention a flange support is attached to the conduits, or the anchor for the strut system, and the flange support includes a portion of a spherical socket recess. A flange plate removably attached to the flange support by bolts has a similar spherical recess defined therein in opposed relationship to that formed in the flange support, and a ball member having a spherical head is received within the resultant substantially spherical socket defined thereby. The ball includes a threaded stem extending through an opening formed in the flange plate, and the ball stem is threaded into a threaded bore defined in the end of the space bar. Each end of the brace bar is provided with a ball assembly, and as the threads on the balls and bars end bores of a common bracing bar are of opposite hand relative rotation between the bracing bar and associated balls will adjust the separation between the ball heads in a turnbuckle effect.

When it is desired to remove a bracing bar of an assembled conduit bracing system it is merely required that the bolts of the flange plates be removed permitting the ball head to be removed from the associated socket, and such disassembly may be achieved without disturbing the adjacent conduits or braces.

BRIEF DESCRIPTION OF THE DRAWINGS

The aforementioned objects and advantages of the invention will be appreciated from the following description and accompanying drawings wherein:

FIG. 1 is a perspective view of a flexible conduit system in accord with the invention illustrating the bracing strut system in place, FIG. 2 is an elevational detail view, partially sectioned, illustrating the bracing bar end structure as assembled to a flange support, and FIG. 3 is a sectional view as taken along Section III—III of FIG. 2.

DESCRIPTION OF THE PREFERRED EMBODIMENT

For purposes of illustration, FIG. 1 discloses a steam system utilizing flexible conduits, and it is a system of this type with which the bracing struts in accord with the invention may be utilized. A main steam pipe is illustrated at 10, and a plurality of safety relief valves 12 are mounted thereon in communication with the pipe. A plurality of flexible conduit systems generally indicated at 14, two of which are illustrated, are disposed in side by side relationship communicating with the valves, and such conduit systems include linear conduit members 16 and 18 interconnected by flexible couplings, and the conduit systems also include elbow portions 20 upon which flange support brackets 22 are welded. The conduit flexible couplings 24 are usually of the ball type, such as commercially available from Aeroquip Corporation Model BB 31067-70-11, and such ball joints or couplings permit a substantially universal limited movement between the associated conduits to accommodate contraction and expansion under thermal, seismic and pressure shock movements variations.

The conduit systems 14, because of the flexibility of the ball couplings 24, will move in a random manner as they expand and contract, and if bracing means are not utilized it is possible for the conduits to become misaligned and disoriented to an extent which may impair proper functioning and cause clearance or operating problems. Accordingly, a bracing system is utilized to control the relative relationship between the conduits and prevent excessive misalignment, yet the bracing system must be of such character as not to interfere with the desired flexibility of the system with respect to thermal expansion and contraction.

The disclosed flexible conduit bracing system consists of a plurality of bracing bars or rods 26 rigidly interposed between adjacent conduit systems 14, and one of the bracing bars is anchored to a fixed point. The rigidity of the bars will maintain spacing between adjacent conduits, and the bracing bars are self-aliging with respect to the associated conduits by means of a ball and socket connection with supports defined upon the conduit.

Each of the elbows 20 is provided with a boss 28 which includes a central bracket plate 22, and a mounting flange support plate 30 is mounted upon each side of the bracket 22 by four bolts 32, FIG. 2. As will be appreciated from FIG. 2, the support plates 30 are of a flat configuration and include a concave recess 34 whose surface is of a spherical configuration. Four threaded holes 36 are defined in each support plate equidistant from the axis of the recess 34.

A flange 38 is releasably mounted on each of the support plates 30 by four headed bolts 40 which extend through holes 42 of a larger diameter than the bolts. The bolts 40 thread into the support plate holes 36 permitting the flanges 38 to be tightly held against the associated support plate 30 as will be appreciated from the drawings. The flanges 38 each include a spherical recess 44 in opposed facing relationship to the support plate recess 34, and these two recesses together define a substantially spherical socket. An opening 46 defined in flange 38 coaxial with the recess 44 provides access to the recess by the ball member mounted upon the bracing bar 26 as will be later described.

The bracing bar or strut 26 consists of a metal rod having a threaded bore 48 at each end. A ball member 50 is mounted in each end of the strut 26 and the ball member includes a elongated threaded stem 52 which mates with the threads of the associated strut end. Also, the ball member 50 includes a ball head 54 received within the socket defined by the recesses 34 and 44. A lock nut 56 threaded upon the stem 52 may be tightened against the end of the strut to lock the ball member against relative rotation of the strut.

The threads at opposite ends of a common strut are of opposite hand or pitch whereby rotation of the strut 26 relative to its associated ball members 50 produces a turnbuckle type adjacent increasing or decreasing the distance separating the ball members of an associated strut depending on the direction of strut rotation. Accordingly, the effective length of the bracing strut may be easily and accurately regulated, and tightening of the lock nuts 56 will maintain the desired adjustment.

It will be appreciated that the aforedescribed assembly will ridigly brace and relate adjacent conduits to each other, and the end bracing struts 26′, FIG. 1, may be attached to an anchor generally indicated at 58 by a bracket plate, support plate and flange of identical construction to those components previously described. Accordingly, the assembled bracing strut system will permit vertical or horizontal deflection of the individual conduit systems, but will prevent the spacing between the conduit systems for varying or becoming non vertical. It will be appreciated that the conduit systems 14 will be directly anchored or connected to fixed structure at their lower regions, not shown.

An advantage of the disclosed apparatus lies in the ability of one of the bracing struts to be removed from the conduit systems without distributing the assembly of the other struts to their associated conduits. For instance, when it is desired to disassemble a conduit, or should the bracing strut itself require replacement, it is only necessary to remove the flanges 38 associated with each ball member 50 of a common strut by unthreading bolts 40, and unloosening of the lock nuts 56 will permit the ball members to be threaded into the strut sufficiently to remove the head from the associated flange support recess 34 permitting the strut assembly to be removed from the associated conduit systems. Reversal of this procedure readily permits the bracing struts to be reassembled, without distributing the adjacent conduits.

It is appreciated that various modifications to the invention will be apparent to those skilled in the art without departing from the spirit and scope of the inventive concepts.

We claim:

1. A bracing strut assembly for flexible conduit systems comprising, in combination, a flange support bracket having opposite sides and fixed to the conduit to be braced, a pair of spaced planar flange supports, first threaded fasteners mounting a flange support on each side of said bracket, a pair of planar flanges, second threaded fasteners mounting each flange upon a flange support, a ball socket defined by a semi-spherical recess formed in each of said associated flange supports and flanges, an opening defined in each flange communicating with the associated socket, a rigid bar having opposite ends, a bore defined on each end of said bar, threads defined in each bore, the thread pitch within said bores being of opposite hand, and a ball having a threaded stem rotatably mounted in each bar end bore extending through a flange opening and a spherical head received within a socket, the transverse dimension of said openings being greater than the transverse dimension of said stems permitting oscillation of said heads within the associated socket.

* * * * *